(12) United States Patent
Gunter

(10) Patent No.: US 7,833,599 B1
(45) Date of Patent: *Nov. 16, 2010

(54) METHOD FOR PRODUCING A MULTILAYER COMPOSITE, AND A COMPOSITE PRODUCED IN SUCH A MANNER

(75) Inventor: Walter Gunter, Forchheim (DE)

(73) Assignee: 4P Folie Forchheim Zweigniederlassung der Huhtamaki Van Leer Deutschland GmbH & Co. KG, Forchheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/831,320

(22) PCT Filed: Nov. 3, 1999

(86) PCT No.: PCT/EP99/08404

§ 371 (c)(1),
(2), (4) Date: May 7, 2001

(87) PCT Pub. No.: WO00/27628

PCT Pub. Date: May 18, 2000

(30) Foreign Application Priority Data

Nov. 6, 1998 (DE) ................................ 198 51 104

(51) Int. Cl.
  *B32B 9/00* (2006.01)
  *B32B 7/12* (2006.01)
  *B29C 47/00* (2006.01)

(52) U.S. Cl. ............ 428/40.1; 428/40.9; 428/41.3; 428/41.7; 428/41.8; 428/352; 428/354; 156/244.11; 156/244.23; 156/244.24; 156/247

(58) Field of Classification Search ................ 428/40.1, 428/40.9, 41.3, 41.7, 41.8, 352, 354; 156/244.11, 156/244.23, 244.24, 247; 427/207.1, 208.4, 427/208.8

See application file for complete search history.

(56) References Cited

U.S. PATENT DOCUMENTS

| 4,339,485 A | | 7/1982 | Shibano et al. |
| 4,425,176 A | * | 1/1984 | Shibano et al. ........ 156/244.11 |
| 4,626,460 A | * | 12/1986 | Duncan .................. 428/41.4 |
| 5,605,717 A | | 2/1997 | Simmons et al. |
| 5,612,107 A | | 3/1997 | Sangani et al. |
| 5,807,632 A | * | 9/1998 | Pedginski ................ 428/352 |
| 6,045,922 A | * | 4/2000 | Janssen et al. ........... 428/515 |
| 6,777,053 B1 | | 8/2004 | Gunter |
| 2004/0013838 A1 | * | 1/2004 | Guenter .................. 428/40.1 |

FOREIGN PATENT DOCUMENTS

| DE | 3614255 A1 | 10/1987 |
| DE | 2092281 | 3/1993 |
| DE | 4209676 A1 | 9/1993 |

(Continued)

*Primary Examiner*—Victor S Chang
(74) *Attorney, Agent, or Firm*—Collard & Roe, P.C.

(57) ABSTRACT

Process for the production of a multilayer composite material with a plastic layer that has release properties with respect to adhesives, where the materials producing the release properties are located within the plastic layer, where a first web is provided in production of the composite materia on the one side of which a layer of adhesive is located, after which the plastic layer with the release properties follows, which is in turn bonded to a second web.

1 Claim, 1 Drawing Sheet

FOREIGN PATENT DOCUMENTS

| | | |
|---|---|---|
| DE | 4320141 A1 | 12/1994 |
| DE | 195 48 265 | 6/1997 |
| EP | 0216300 A2 | 4/1987 |
| JP | 55 080479 | 6/1980 |
| JP | 59 122570 | 7/1984 |
| WO | WO95/33013 | 12/1995 |

* cited by examiner

METHOD FOR PRODUCING A MULTILAYER COMPOSITE, AND A COMPOSITE PRODUCED IN SUCH A MANNER

CROSS REFERENCE TO RELATED APPLICATIONS

Applicant claims priority under 35 U.S.C. §119 of German Application No. 198 51 104.3 filed Nov. 6, 1998. Applicant also claims priority under 35 U.S.C. 365 of PCT/EP99/08404 filed Nov. 3, 1999. The international application under PCT article 21 (2) was not published in English.

BACKGROUND OF THE INVENTION

Field of the Invention

The invention relates to a process for the production of a multilayer composite material with a plastic layer that has release properties with respect to adhesives, where the materials producing the release properties are located within the plastic layer.

SUMMARY OF THE INVENTION

The purpose of the invention is to indicate a process with which a composite material can be produced efficiently from a first web that can be designed to be a substrate web, an adhesive, a release layer and a second web that can also be designed to be a substrate web for the release layer.

In the solution to this problem proposed by the invention, a first web is provided in production of the composite material on one side of which a layer of adhesive is located, after which the plastic layer with the release properties will follow, which is in turn bonded to a second web.

In a particularly advantageous development of the invention, a web of paper or a similar material is provided as the first web.

The adhesive layer, the release layer and a second web that acts as the substrate web for the release layer are applied to this paper web.

A web made from metal foil can be provided instead of the paper web in accordance with a further development of the invention.

It is also possible in accordance with a further development of the invention that a nonwoven fabric is provided as the first web.

A particularly advantageous development of the invention is characterised by the fact that the layers are extruded onto the first web simultaneously by the coextrusion process.

In another advantageous development of the invention, a web of paper or a different pre-produced material is provided as the second web.

It is particularly advantageous if in accordance with a further development of the invention the layers including the first web are extruded onto the second web.

It can also be very advantageous if in accordance with a further development of the invention at least the adhesive layer and the layer with the release properties are extruded between the two webs.

In another advantageous development of the invention, the first and/or second web are oriented if plastic is used for one or both of them.

The strength of these webs is increased considerably by doing this.

The drawings illustrate the fact that the layers are directly bonded together and are directly bonded to the webs.

A process for the production of a five layer composite material (1, 21) with a plastic layer (4, 24) that has release properties with respect to adhesive comprising
locating materials producing the release properties within the plastic layer, wherein a first web (2, 22) is provided in production of the composite material (1, 21) on one side of which a layer of adhesive (3, 23) is located, and said adhesive layer is always coextruded and directly bonded together with the plastic layer (4, 24) with the release properties, which is in turn directly bonded to a second web (5, 25); and
wherein said first web and said second web is selected from the group consisting of paper, metal foil, and non-woven fabric; and
providing the first web and the second web simultaneously in a spaced apart position; and extruding the adhesive layer (3, 23) and the layer (4, 24) with the release properties between the two webs (2, 22 and 5, 25); and forming the bond directly with the two webs;
wherein a further layer (26) is provided that is located on and directly bonded to one side of the web (2, 5 or 22, 25), such that one web is provided with said further layer (26) directly bonded to the web.

A process for the production of a five layer composite material (1, 21) with a plastic layer (4, 24) that has release properties with respect to adhesives consisting of
locating materials producing the release properties within the plastic layer, wherein a first web (2, 22) is provided in production of the composite material (1, 21) on one side of which a layer of adhesive (3, 23) is located, and said adhesive layer is always coextruded and directly bonded together with the plastic layer (4, 24) with the release properties, which is in turn directly bonded to a second web (5, 25); and
wherein said first web and said second web is selected from the group consisting of paper, metal foil, and non-woven fabric; and
wherein a further layer (26) is provided that is located on and directly bonded to one side of the web (2, 5 or 22, 25), such that one web is provided with said further layer (26) directly bonded to the web; and
wherein said layer of adhesive (23), said release layer (24), said web (25), and said further layer (26) are applied to the web (22) by coextrusion.

A process for the production of a four layer composite material (1, 21) with a plastic layer (4, 24) that has release properties with respect to adhesives comprising
locating materials producing the release properties within the plastic layer, wherein a first web (2, 22) is provided in production of the composite material (1, 21) on one side of which a layer of adhesive (3, 23) is located, and said adhesive layer is always coextruded and directly bonded together with the plastic layer (4, 24) with the release properties, which is in turn directly bonded to a second web (5, 25); and
wherein said first web and said second web is selected from the group consisting of paper, metal foil, and non-woven fabric; and
providing the first web and the second web simultaneously in a spaced apart position; and extruding the adhesive layer (3, 23) and the layer (4, 24) with the release properties between the two webs (2, 22 and 5, 25); and forming the bond directly with the two webs.

It is also very advantageous if in accordance with a further development of the invention a web which is pre-produced from plastic is oriented before it is used.

In accordance with an advantageous development of the invention, a multilayer composite material is characterised by the fact that a first web and at least a second web are provided, between which a layer of adhesive and a further layer that has release properties with respect to the adhesive are located.

In a further advantageous development of the multilayer composite material, further layers are provided that are located on the outside of the first web and/or the second web.

It has also proved to be very advantageous if in accordance with a further development of the invention the first and/or second web are made from an oriented plastic film.

DETAILED DESCRIPTION OF PREFERRED EMBODIMENTS

Figure 1:
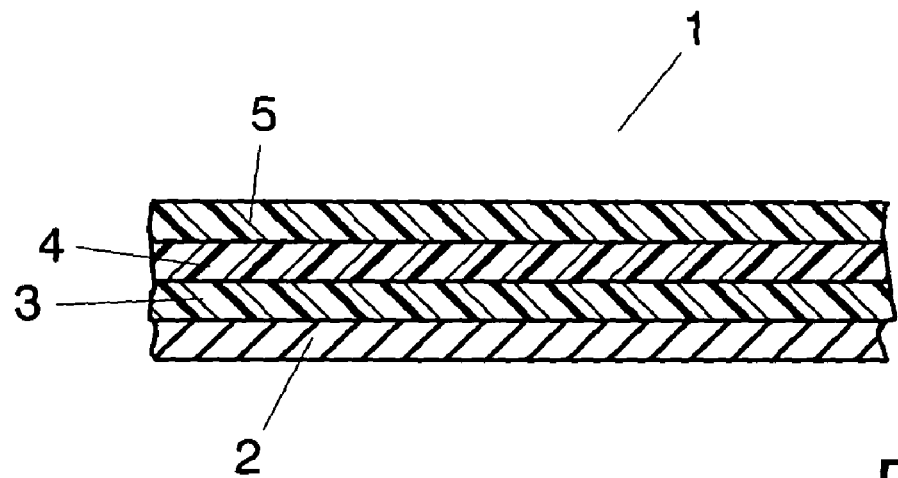
FIG. 1 shows a four-layer composite material with a web of paper as the substrate web and FIG. 2 shows a five-layer composite material, in which a nonwoven fabric is provided as the substrate web for the adhesive layer.

1 in FIG. 1 is a composite material that includes a first web 2 made of paper. A layer of adhesive 3, a layer 4 that has release properties with respect to the adhesive and a plastic layer 5 have been applied to this paper web 2 by the coextrusion process. The other side of the paper web 2 can be provided with other coatings in the same process operation too.

Figure 2:
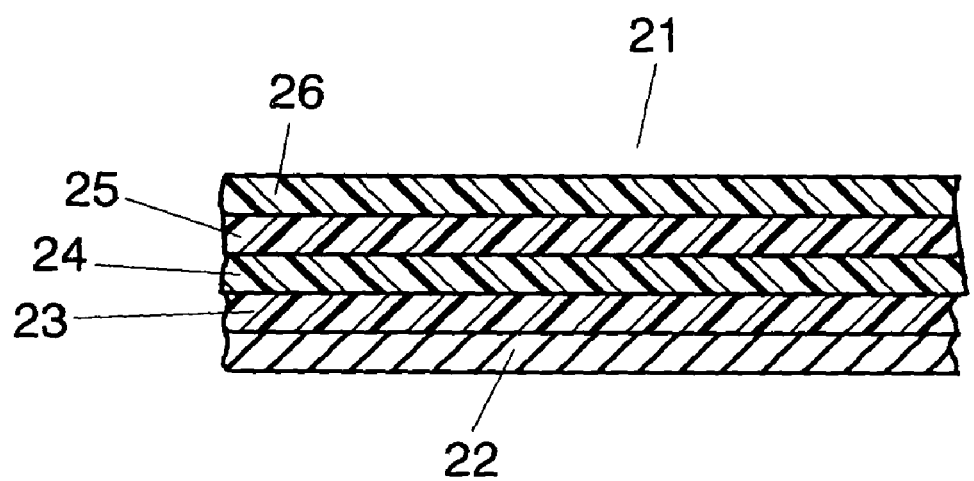

A composite material 21 consisting of five layers is provided in the embodiment shown in FIG. 2, where the first web 22 is made from a nonwoven fabric. Different web materials such as metal are possible alternatives to paper or nonwoven fabric. A layer of adhesive 23, a release layer 24, a plastic layer 25 and a covering layer 26 for the plastic layer have been applied to the web 22 by the coextrusion process.

A second web which consists of paper, nonwoven fabric, metal or plastic and onto which the other layers are extruded can be used in both embodiments instead of the plastic layer 5 or 25.

It is conceivable in addition to this that two pre-produced webs are used, between which the other layers are applied at the same time by the extrusion process. It is also possible in this context to coat the outsides of the two pre-produced webs in the same process operation.

When paper is used as the substrate material for the first web, smooth, printable papers are primarily used for the side that is coated with adhesive.

Simple, inexpensive papers are on the other hand also used for the second web that is provided with a release layer.

When plastic webs are used, they can be oriented before they are processed, while webs that consist exclusively of plastic can also be oriented after production of the composite material has been completed.

If the two webs or layers 2, 22 and 5, 25 are made out of plastic, different plastics can be used for them, irrespective of whether they are processed as finished webs or are extruded. LDPE, LLDPE, HDPE, mPE, PS, PET, PETP, PP and OPP are particularly advantageous in this context.

The material thickness varies between 20 and 200µ here.

Possible adhesives are extrudable, permanently tacky adhesives based on hotmelts and polyolefins with appropriate tackifying additives. SIS, SBS, SEBS and SEP block copolymers with melt indices of between 8 and 65 g/10 min at 200° C. and 5 kg have for example, been used. The styrene content of the polymers varies between 10 and 35%. The properties of the adhesive layer are controlled by the addition of resins and plasticisers, e.g. by means of aliphatic hydrocarbon resins, polyterpene resins, hydrolysed hydrocarbon resins, aromatic hydrocarbon resins, paraffin waxes, microcrystalline waxes, polyisobutylene and process oils.

Liquid components are processed into an extrudable form by carrying out a compounding operation beforehand.

Another way to produce the adhesive layer involves the inclusion of UV acrylates or UV-cured PSAs between the other layers by using melt transport technology.

The above mentioned abbreviations are defined as follows:

| | |
|---|---|
| LDPE = | low density polyethylene |
| LLDPE = | linear low density polyethylene |
| HDPE = | high density polyethylene |
| mPE = | metallocene catalyzed polyethylene |
| PET = | polyethylene terephthalate |
| PETP = | polyethylene terephthalate polymer |
| PP = | polypropylene |
| OPP = | oriented polypropylene |
| PS = | polystyrene |
| SIS = | styrene isoprene styrene |
| SBS = | styrene butadiene styrene |
| SEBS = | styrene ethylene butadiene styrene |
| PSA = | pressure sensitive adhesive |
| SEP = | styrene ethylene propylene |
| UV = | ultra violet |
| UVC = | ultra violet curing |

The invention claimed is:

1. A process for the production of a composite material (1) consisting of four layers with a plastic layer (4) that has release properties with respect to adhesives consisting of
locating materials producing the release properties within the plastic layer, wherein a first web (2) is provided in production of the composite material (1) on one side of which a layer of adhesive (3) is located, and said adhesive layer is always coextruded and directly bonded together with the plastic layer (4) with the release properties, which is in turn directly bonded to a second web (5); and
wherein said first web and said second web is selected from the group consisting of paper, metal foil, and non-woven fabric; and
providing the first web and the second web simultaneously in a spaced apart position; and extruding the adhesive layer (3) and the plastic layer (4) with the release properties between the two webs (2 and 5); and forming the bond directly with the two webs.

* * * * *